(12) United States Patent
Banerjee et al.

(10) Patent No.: US 12,332,962 B2
(45) Date of Patent: Jun. 17, 2025

(54) DYNAMIC MITIGATION OF SLOW WEB PAGES

(71) Applicant: SAP SE, Walldorf (DE)

(72) Inventors: Debashis Banerjee, Bengaluru (IN);
Hari Babu Krishnan, Bangalore (IN);
Prasanna Kumar Govindappa, Bangalore (IN)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 17/459,994

(22) Filed: Aug. 27, 2021

(65) Prior Publication Data
US 2023/0064010 A1    Mar. 2, 2023

(51) Int. Cl.
| | |
|---|---|
| *G06F 16/957* | (2019.01) |
| *G06F 9/451* | (2018.01) |
| *G06F 16/955* | (2019.01) |
| *G06N 20/00* | (2019.01) |

(52) U.S. Cl.
CPC ........... *G06F 16/957* (2019.01); *G06F 9/453* (2018.02); *G06F 16/9566* (2019.01); *G06N 20/00* (2019.01)

(58) Field of Classification Search
CPC .... G06F 16/957; G06F 9/453; G06F 16/9566; G06N 20/00
See application file for complete search history.

(56) References Cited

U.S. PATENT DOCUMENTS

| | | | | |
|---|---|---|---|---|
| 6,356,437 | B1 * | 3/2002 | Mitchell | G06F 1/163 361/730 |
| 6,741,699 | B1 * | 5/2004 | Flockhart | H04M 7/003 379/265.09 |
| 7,475,089 | B1 * | 1/2009 | Geddes | G06F 16/958 707/999.102 |
| 11,783,256 | B1 * | 10/2023 | Hernandez | G06Q 10/06316 705/7.38 |
| 2007/0250841 | A1 * | 10/2007 | Scahill | H04L 67/75 719/320 |
| 2008/0104224 | A1 * | 5/2008 | Litofsky | H04L 67/535 709/224 |
| 2014/0163934 | A1 * | 6/2014 | Zhang | G06Q 10/06 703/2 |
| 2015/0350370 | A1 * | 12/2015 | Lepeska | G06F 16/957 709/219 |
| 2016/0156537 | A1 * | 6/2016 | Aumann | H04L 43/04 709/224 |
| 2017/0316438 | A1 * | 11/2017 | Konig | G06Q 30/01 |
| 2020/0396303 | A1 * | 12/2020 | Webber | H04L 67/535 |

* cited by examiner

*Primary Examiner* — Kuen S Lu
(74) *Attorney, Agent, or Firm* — Klarquist Sparkman, LLP

(57) ABSTRACT

Systems, methods, and computer media are described for dynamically mitigating slow web pages. Wait time thresholds can be established for individual pages or categories of pages. The wait time thresholds reflect a delay time determined to be acceptable to users. Pages for which wait time thresholds are established can be monitored, and when requests to load one of the pages results in a delay beyond the threshold, which indicates a slow page, alternative content can be provided to the requesting user. The alternative content is selected to be useful to the user in accomplishing the user's goal despite the delay and can be a help page or information for accessing desired information in another way.

20 Claims, 7 Drawing Sheets

FIG. 4

| PAGE NAME | URL | GRAPH ID | WAIT TIME THRESHOLD | UNIT | ALTERNATE PAGE(S) |
|---|---|---|---|---|---|
| BaseURL | /Sourcing/Main/aw/clid | 32 | 2 | seconds | (1) /Admin<br>(2) /HelpPageCLID |
| | | | | | |

...

DYNAMIC MITIGATION OF SLOW WEB PAGES

BACKGROUND

Applications commonly access data from data stores through the Internet. For various reasons, delays can be encountered in loading desired data, resulting in slow web pages.

BRIEF DESCRIPTION OF THE DRAWINGS

FIG. 4 illustrates an example slow page configuration user interface.

DETAILED DESCRIPTION

Figure 1:
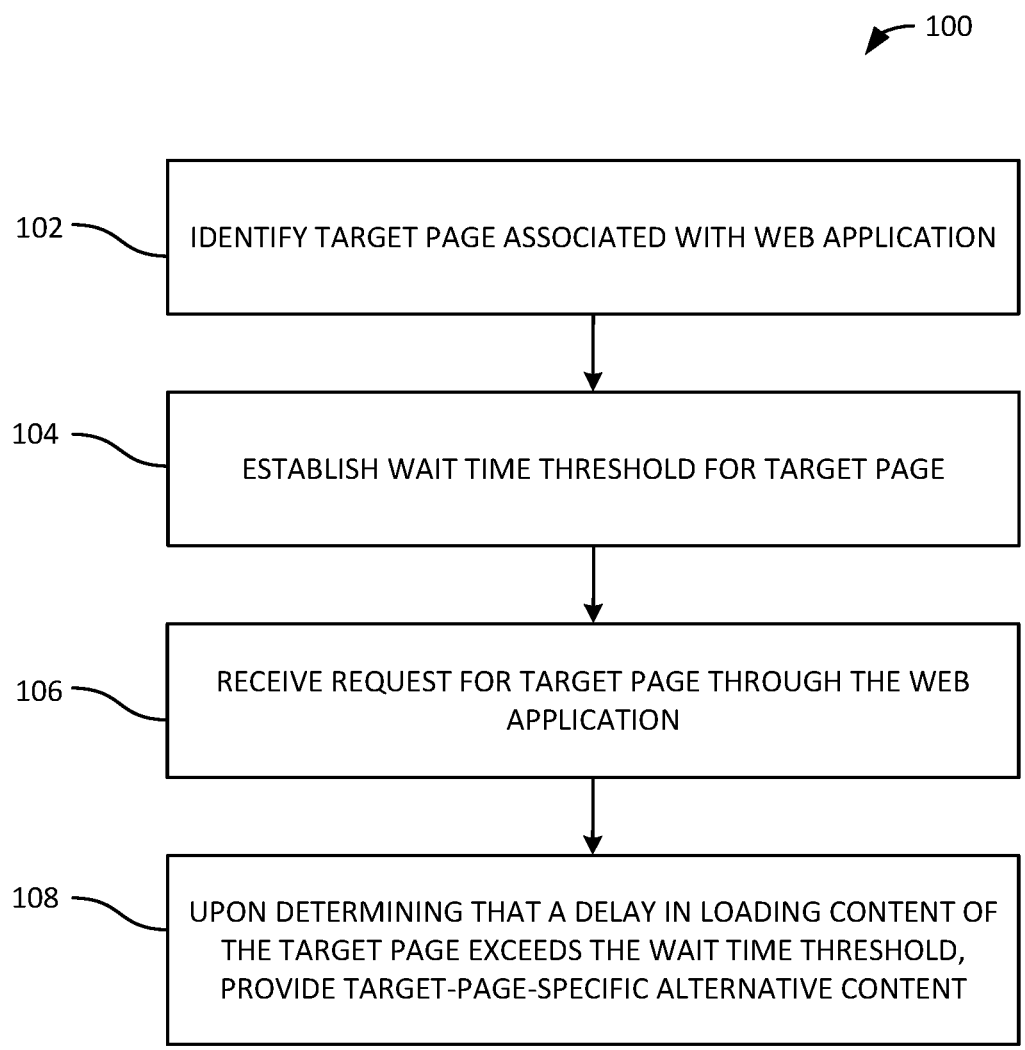
FIG. 1 illustrates an example method of dynamically mitigating slow web pages.

Web applications typically retrieve data through the Internet from data stores for display and/or processing. "Slow pages" in web applications are pages that experience noticeable delays in loading such data, which impacts the usability and efficiency of the web application. Delays can occur for a variety of reasons, including attempting to load large amounts of data. Many web applications, especially in an enterprise context such as procurement or inventory management, deal with large amounts of data that are loaded and displayed. As a specific example, a line item in a procurement application can have hundreds of fields, some of which are dynamically computed, and a large number of line items (e.g., 2000 or more) can be displayed with more line items queued for display (e.g., 10,000 or more additional items).

Delays can also occur due to complex flows such as application programming interface (API) calls, calls to other services, slowness or noisy neighbor problems in a multi-tenant cloud environment, etc. Multi-tenant environments are environments in which data for multiple tenants is stored on a same physical computer. Tenants, also referred to as realms, correspond to different user groups (e.g., enterprise customers). Because the same physical machine is shared, activity of one co-tenant can adversely affect other co-tenants. For example, a "noisy neighbor problem" refers to sharing a server with a tenant who is performing computing-intensive operations (e.g., generating end-of-quarter data) and causing a delay for other co-tenants. In this way, a co-tenant performing operations that do not typically result in a delay nonetheless experiences a delay because of the other tenant.

Conventionally, when slow pages are encountered, they are dealt with by loading less data, caching some data, showing a spinner, hourglass, or other "loading" indicator, etc.

The examples described herein generally provide a dynamic approach to mitigating slow pages. Wait time thresholds can be established for individual pages or categories of pages. Wait time thresholds reflect a delay time determined to be acceptable to users. Pages for which wait time thresholds are established can be monitored, and when requests to load one of the pages results in a delay beyond the threshold, alternative content can be provided to the requesting user rather than having the user simply watch a loading indicator and wait. The alternative content is selected to be useful to the user in accomplishing the user's goal despite the delay.

Examples of alternative content include a description of an alternative way of accessing the content of the page, an identification of a setting, configuration, or parameter causing the wait time threshold to be exceeded, help page content, or a link to a help page. The alternative content can be provided in place of the requested page, in addition to a partial target page, in a pop-up window, etc. In some examples, machine learning is used to dynamically adjust wait time thresholds, identify potentially slow pages, or set wait time thresholds.

By providing alternative content that allows a user requesting a slow page to manage the situation, additional requests for the slow page are reduced and scarce computing resources are conserved. Examples are described below with reference to FIGS. 1-7.

FIG. 1 illustrates a method 100 of dynamically mitigating slow pages. In process block 102, a target page associated with a web application is identified (e.g., as a potentially slow page). The target page can be manually identified or identified automatically by its page type or other characteristic. Various types of pages can be identified as potentially slow pages, including pages that have previously been slow, pages in which a large amount of data is displayed, or pages for which the requested data resides on a data store shared with a "noisy neighbor" tenant, etc.

In process block 104, a wait time threshold (e.g., two seconds, five seconds, etc.) is established for the target page. The wait time threshold can be specific to one page or specific to a type of page (e.g., pages that load over 1000 data items, pages requesting to display all items, pages loading particular customized forms, etc.). In some examples, the wait time threshold is established for all pages for a particular tenant or customer.

In process block 106, a request for the target page is received through the web application. For example, a user might select an option to "display all items," and the page requested is a page displaying all items. The load time for the target page is monitored (e.g., through built-in browser functionality). In process block 108, upon determining that a delay in loading content of the target page exceeds the wait time threshold, target-page-specific alternative content is provided.

The alternative content provides a requesting user information related to the slow page that can help the user understand the underlying cause of the slow page and/or provide an alternate way to accomplish the user's goals. The target-page-specific alternative content can include help page content or a link to a help page. For example, in a procurement scenario, if a page request to view a large number of contract line item documents (CLIDs) results in a slow page, a CLID-related help page can be displayed. The help page can also reference a way to access content of the target page in a different manner. Continuing the CLID example, the following could be displayed: "This page is currently experiencing delays. Due to the large number of line items, would you like to import CLIDs manually? Please click here to do so."

A help page can also identify a setting, configuration, or parameter causing the wait time threshold to be exceeded. This allows the user to take action to correct the issue. In an SAP sourcing example, a help page can describe defined limits to the number of content items (https://help.sap.com/viewer/36a99e6ce8954882ba1cbe6d42056c3e/cloud/en-US/7c1c716571ea1014b98f821728725118.html.) In this context, when the page is slow a user can be directed to the help page, and the user can identify that a limit is being approached or breached. Parameters such as terms per line item, number of suppliers, maximum items per section, etc., could be reaching the defined limits. Once the user knows that limits are being exceeded, the user can change the configuration and/or product data to reduce/remove the problem.

Figure 3:
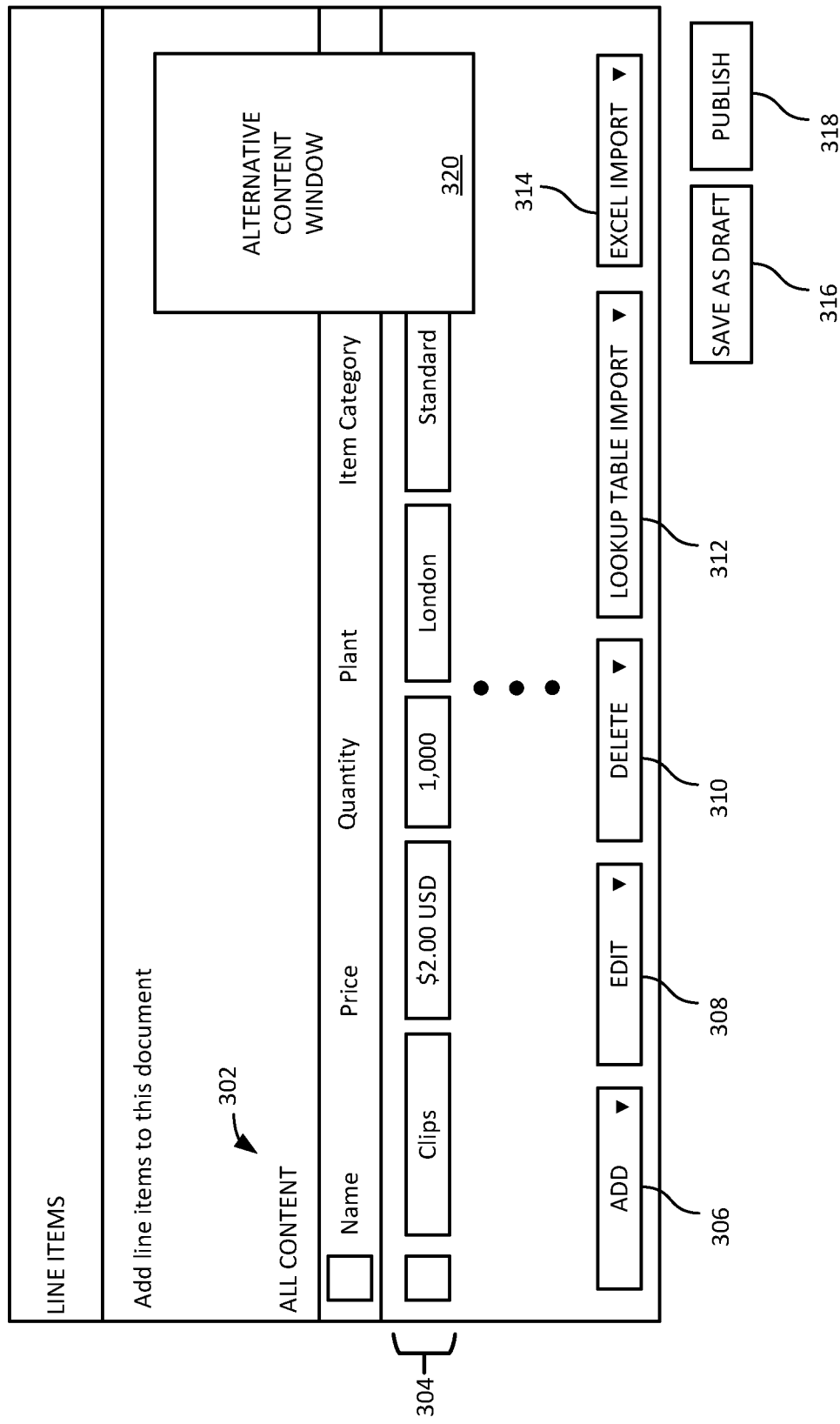
FIG. 3 illustrates an example slow page in which an alternative content window is presented.

The alternative content can be provided either in place of the target page, in addition to a partial target page (e.g., showing partial data or an empty spot for data that has not yet loaded), in a pop-up window, or in another user interface element. An example of this is shown in FIG. 3.

The wait time threshold can be configured by an administrator for a group of users of which the requesting user is a part. As an example, in an administrator page, a tab or link in an administrator user interface can be provided for configuring potentially slow pages for monitoring (also referred to simply as "slow pages"). Such configuration can include associating a URL of a slow page with a wait time threshold, URLs for one or more pages having alternative content, and other information. An example of this is illustrated in FIG. 4.

In some examples, multiple alternative URLs are provided and assigned a priority (e.g., first, second, third priority, etc.). In such a situation, if the target page is determined to be slow, the highest priority alternative page that is not slow is used for the alternative content. Thus, if the first priority alternative page were also found to be slow, the second priority alternative could be used to provide alternate content. In some examples, the configured slow page is an API rather than a URL. In some examples, wait time thresholds are set to a default value by the web application for some or all pages, and the wait time thresholds can be modified by an administrator.

An administrator UI can also include a current slow page list that includes monitored pages for which a delay has recently (e.g., in the last day, hour, ten minutes, etc.) exceeded the page's wait time threshold. This allows an administrator to observe current trends and take action (including adjusting wait time thresholds) when a page frequently appears on the current slow page list.

Machine learning (e.g., regression analysis or other machine learning approaches) can be used to dynamically adjust the wait time threshold in response to, for example, a history of delays in loading the content of the target page (or pages sharing characteristics with the target page) or user feedback regarding the target page. For example, a machine learning algorithm can determine that a wait time threshold is repeatedly being exceeded for a particular page and can increase the threshold (e.g., if the increase is within a particular range, such as up to 50%). Similarly, a machine learning algorithm can identify user complaints or other feedback for a particular threshold value and determine a new lower or higher threshold. For example, a user may not mind waiting ten seconds for a page to load and would prefer a higher threshold if alternate content is provided after a five second delay. Submitted feedback and delay history can be used together to adjust wait time thresholds.

Machine learning can also be used to establish wait time thresholds. For example, by monitoring a history of delays for page requests, a typical load time and/or statistical distribution of load times can be determined, and a wait time threshold can be established based on a number of standard deviations from the mean or based on the top five, ten, etc., percent of longest delays. Such an approach can also be used to suggest revisions to administrator-established wait time thresholds.

In some examples, an administrator places pages being monitored into a list, and a machine learning model is provided page loading times (including those below and above the wait time threshold). The machine learning model can be, for example, a regression model, that can determine at which point each page should be proactively be placed in the slow page list (e.g., based on trends showing increasing delays) or trigger an administrator alert.

For regression analysis examples, various approaches can be used. In a cluster-based approach, prior page load times for a page are put in a cluster where most data points are expected and compared against a threshold within a range. As a specific example, consider a page with a threshold of 1 second where most page loads are in a cluster with a range between 0.3 to 0.6 seconds and the typical range is between 0.2 and 0.7. Once more than some percentage of page loads are outside the cluster, a problem could be identified, and the page could be placed in a slow page list.

Another approach is a regression analysis where a regression line is created based on a scatter plot of page load times. A regression line fit to the page load times can be defined as $y=mx+b$, where x is the current page load time, m is a number of items in a page or a constant, and b is a constant for the load value in the system. With this knowledge, one can compare new page load values and determine if the new page values fit the regression line. If page values are increasing towards a slow page threshold, then the page could preemptively be put in the slow page list. If page load time is well away from the regression line, the algorithm could wait and see if it is an outlier.

In deep learning approaches, given values (e.g., parameters, number of items, etc.) and a set of neural networks, deep learning can predict if a page will go out of range. Implementation can involve training the model using page load times, data such as system load and line parameters, and then predict based on lines, sizes of items, etc., whether a particular combination gives a page load time beyond a threshold or out of a desired range. After the model is trained, the model can predict whether a page is becoming slow and add the page to a slow page list. Standard libraries such as Keras (open-source library providing a Python interface) can be used to implement the neural networks.

Different approaches can be selected or combined depending on desired accuracy and available hardware and system resources. For example, a large neural network typically requires more expensive hardware compared to a relatively simpler clustering algorithm.

Figure 2:
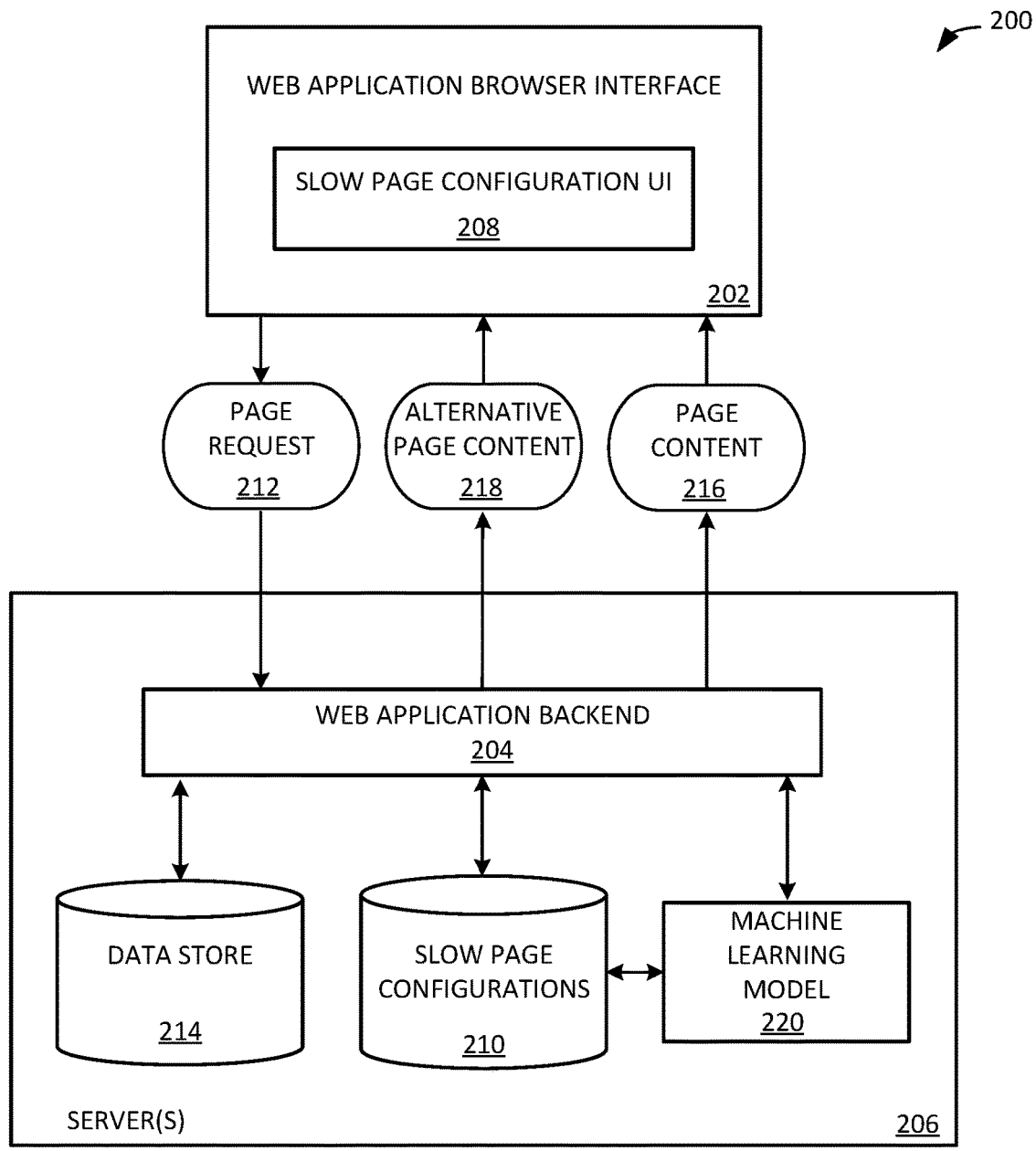
FIG. 2 illustrates an example system configured to dynamically mitigate slow web pages.

FIG. 2 illustrates a system 200 configured to dynamically mitigate slow pages. System 200 illustrates a web application context in which there is communication between a client-side web application 202 (e.g., an interface provided through a browser) on a client computing device and a web application backend 204 implemented on one or more server(s) 206. Client-side web application 202 includes a slow page configuration user interface (UI) 208 in which the URLs of potentially slow pages are associated with wait time thresholds and alternate URLs having alternative content. Slow page configuration UI 208 can be part of an administrator access interface. Client-side web application 202 can also include a current slow page user interface that lists pages that are currently or have recently exceeded their corresponding wait time threshold.

Potentially slow pages that have been associated with a wait time threshold and one or more alternate URLs are stored in slow page configurations data store 210 and can be accessed by client-side web application 202 and/or web application backend 204 to monitor load times for requested pages. A page request 212 is submitted by a user through client-side web application 202. Data associated with page request 212 is accessed by web application backend 204 from data store 214, which can be, for example, a database. If the delay in accessing and loading data from data store 214 to provide the requested page does not exceed a wait time threshold for the page stored in slow page configurations 210, then page content 216 is provided back to client-side web application 202. If, however, the wait time threshold is exceeded, then alternative page content 218 is provided to client-side web application 202. Alternative page content 218 can be content as described, for example, with respect to FIG. 1. Machine learning model 220 can implement a regression analysis or other approach that can be used to proactively identify monitored pages to add to a slow page list or establish or adjust wait time thresholds (e.g., as discussed with respect to FIG. 1).

FIG. 3 illustrates an example slow page 300. Slow page 300 is a line item page in a procurement web application. Slow page 300 displays "all content" 302. All content 302 can be, for example, thousands of line items. An example record 304 for a line item is shown, including fields such as name, price, quantity, plant (that manufactures the item), and item category. Additional fields are also possible. Slow page 300 also provides option 306 to add a line item, option 308 to edit, option 310 to delete, option 312 to import a lookup table, option 314 to import an Excel file, option 316 to save changes as a draft, and option 318 to publish changes.

Slow page 300 requests all content 302, which can be a very large amount of data, which causes the delay in loading page 300 to exceed an established wait time threshold. As a result, alternative content window 320 is displayed. Alternative content window 320 contains alternative content linked to the slow page, and can be, for example, a relevant help page, instructions on how to load the requested information into an Excel or Access file or other format, etc. (as discussed, for example, with respect to FIG. 1). In FIG. 3, alternative content window 320 is shown as a pop-up window. In other examples, the line items under all content 302 would be omitted and replaced with alternative content. In still other examples, an alternate web page is loaded (such as a help page).

FIG. 4 illustrates an example user interface 400 for configuring potentially slow pages. User interface 400 can be accessed, for example, through an administrator page. User interface 400 associates a page name 402, a page URL 404, an identifier (e.g., a graph ID) 406, a wait time threshold 408, a threshold unit 410, and one or more alternate page URLs 412. Other information (or less information) can also be associated.

Slow page 414 shows values for these fields and includes a page name of "BaseURL," a URL of "/Sourcing/Main/aw/clid," a wait time threshold of two seconds, and two alternate pages, "/Admin," which is the first priority alternate page, and "/HelpPageCLID," which is the second priority alternate page if the first priority alternate page is also slow. Thus, if BaseURL takes longer than two seconds to load, the wait time threshold is exceeded, and alternative content corresponding to one of the alternate URLs is provided to a requesting user (e.g., provided for display to the user in a user interface). Monitoring of page wait times can be implemented as a service that is called when pages are requested (or when APIs are called). Identifier 406 is a graph ID. Alternate pages can also have graph IDs, and the graph defines which identifiers are linked (and therefore which URLs are linked). Some nodes of the graph can also be APIs or a set of APIs.

Figure 5:
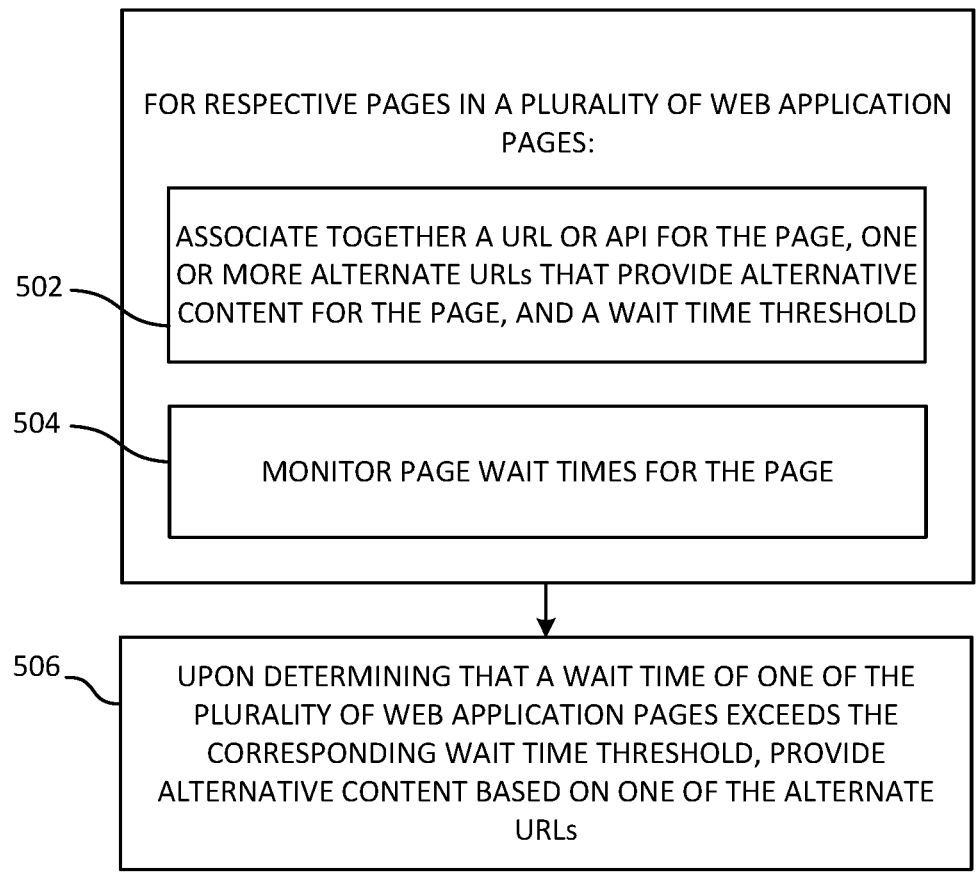
FIG. 5 illustrates an example method of dynamically mitigating slow web pages in which monitored pages are associated with alternate URLs that provide alternative content for the pages.

FIG. 5 illustrates a method 500. For respective pages in a plurality of web application pages, process blocks 502 and 504 are performed. In process block 502, a uniform resource locator (URL) or an application programming interface (API) for the page, one or more alternate URLs that provide alternative content for the page, and a wait time threshold are associated together. In process block 504, page wait times for the page are monitored. The page wait times reflect a delay between receiving a request for the page and loading content of the page. In process block 506, upon determining that a wait time of one of the plurality of web application pages exceeds the corresponding wait time threshold, alternative content is provided based on one of the one or more alternate URLs for the page.

Figure 6:
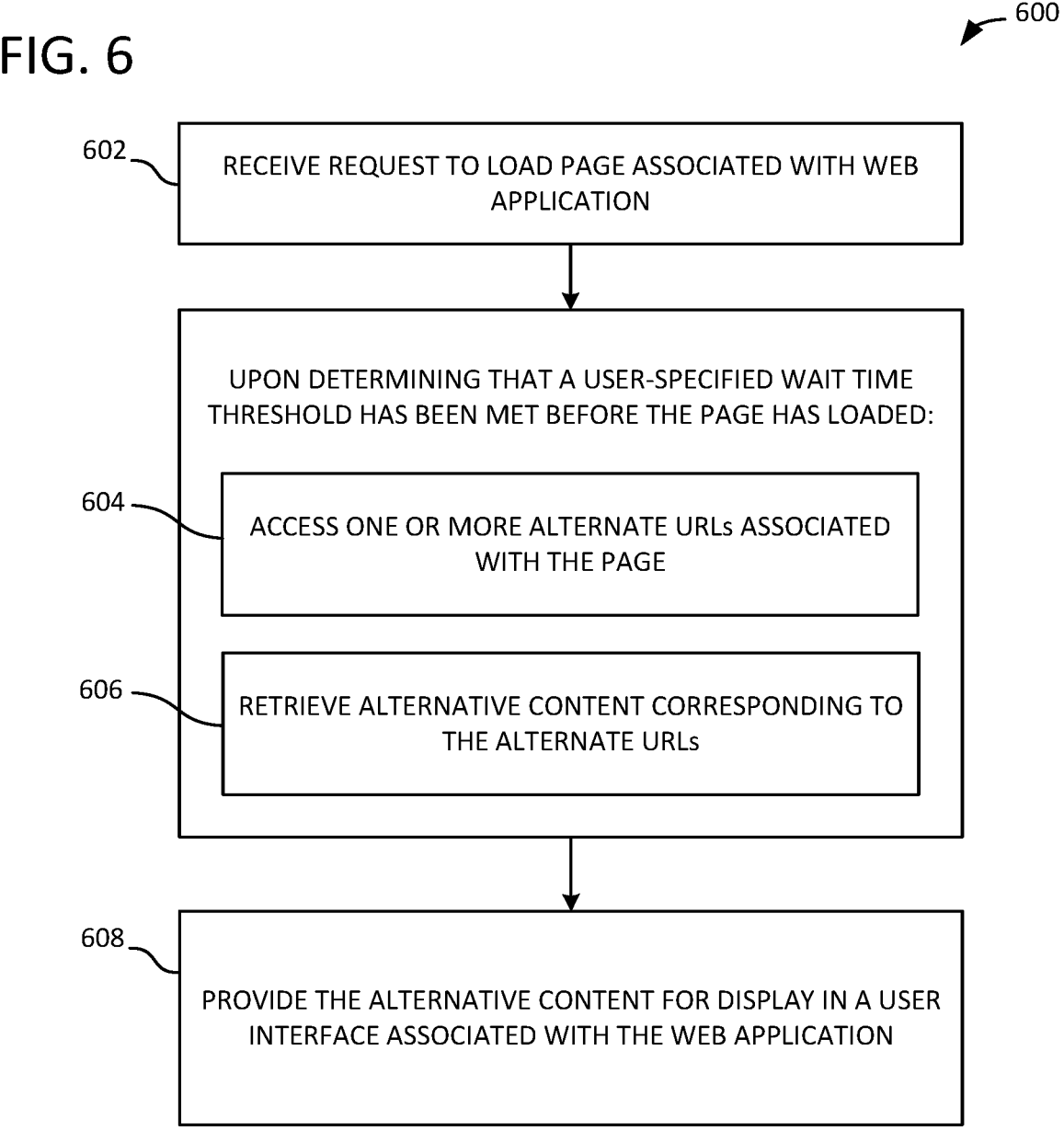
FIG. 6 illustrates an example method of dynamically mitigating slow web pages in which alternative content is provided for display in a user interface upon determining that a wait time threshold has been met.

FIG. 6 illustrates a method 600. In process block 602, a request to load a page associated with a web application is received. Process blocks 604 and 606 are performed upon determining that a user-specified wait time threshold has been met before the page has loaded. In process block 604, one or more alternate URLs associated with the page are accessed. In process block 606, alternative content corresponding to one of the one or more alternate URLs is retrieved. The alternative content includes help page content, a link to a help page, a description of an alternative way of accessing content of the page, or an identification of a setting, configuration, or parameter causing the wait time threshold to be exceeded. In process block 608, the alternative content is provided for display in a user interface associated with the web application.

Example Computing Systems

Figure 7:
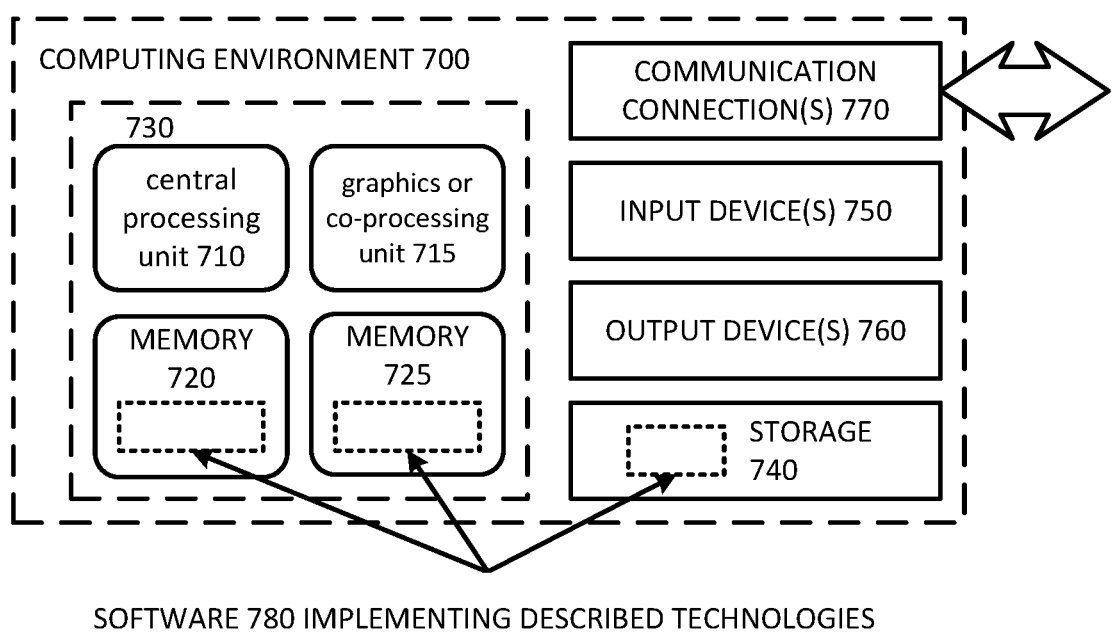
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store slow page configurations 210 and machine learning model 220 of FIG. 2.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store slow page configurations 210 and machine learning model 220 of FIG. 2.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of dynamically mitigating slow web pages, the method comprising:
    from the plurality of web pages, identifying a target web page, associated with a web application, to be monitored for delay in loading content, the identifying comprising using load times determined by monitoring the plurality of web pages, identifying the target web page as previously slow, identifying the target web page as displaying a large amount of data, or identifying the target web page by determining that data used by the target web page resides on a data store affected by a noisy neighbor tenant;
    in response to the identifying, adding the target web page to a slow web page list;
    establishing a wait time threshold for the target web page subsequent to the identifying, wherein wait time thresholds for at least a portion of a plurality of web pages of the slow web page list differ from one another;
    based on the target web page being on the slow web page list, monitoring load times for the target web page;
    receiving a request for the target web page through the web application; and
    upon determining that a delay in loading content of the target web page exceeds the wait time threshold, loading and rendering in a web application target-web page-specific alternative content.

2. The method of claim 1, wherein the alternative content includes content of a help web page or a link to a help web page.

3. The method of claim 1, wherein the alternative content includes an identification of a setting, configuration, or parameter causing the wait time threshold to be exceeded.

4. The method of claim 1, wherein the alternative content is provided either in place of the target web page, in addition to a partial target web page, or in a pop-up window.

5. The method of claim 1, wherein the wait time threshold is specific to the target web page or to a category corresponding to the target web page.

6. The method of claim 1, wherein the wait time threshold is specific to a group of users of the web application and is configured through administrator access for the group of users.

7. The method of claim 1, wherein the wait time threshold is dynamically adjusted using machine learning in response to (i) a history of delays in loading the content of the target web page or content of web pages sharing characteristics with the target web page or (ii) user feedback regarding the target web page.

8. The method of claim 1, wherein the delay in loading the content of the target web page is caused in part by a delay in an application programming interface (API) associated with retrieving data for loading in the target web page.

9. The method of claim 1, wherein identifying the target web page is based on characteristics of the target web page.

10. The method of claim 1, wherein the web application is a procurement application and wherein identifying the target web page to be monitored for delay in loading content is based on a number of items or type of items loaded as the content of the target web page.

11. The method of claim 1, wherein the web application is implemented in a multi-tenant environment in which data for multiple tenants is stored on a same physical computer, and wherein identifying the target web page to be monitored for delay in loading content is based on activity of one or more other tenants of the multiple tenants.

12. The method of claim 1, further comprising modifying a graphical user interface of the web application to include the target-web page-specific alternative content.

13. The method of claim 1, wherein the alternative content includes a description of an alternative way of accessing content of the target web page.

14. A computing system comprising:
    one or more processing units coupled to memory; and
    one or more computer-readable storage media storing instructions that, when executed by the computing system, cause the computing system to execute slow web page mitigation operations, the operations comprising:
        from the plurality of web pages, identifying a target web page, associated with a web application, to be monitored for delay in loading content, the identifying comprising using load times determined by monitoring the plurality of web pages, identifying the target web page as previously slow, identifying the target web page as displaying a large amount of data, or identifying the target web page by determining that data used by the target web page resides on a data store affected by a noisy neighbor tenant;
        in response to the identifying, adding the target web page to a slow web page list;
        establishing a wait time threshold for the target web page subsequent to the identifying, wherein wait time thresholds for at least a portion of a plurality of web pages of the slow web page list differ from one another;
        based on the target web page being on the slow web page list, monitoring load times for the target web page;
        receiving a request for the target web page through the web application; and
        upon determining that a delay in loading content of the target web page exceeds the wait time threshold, loading and rendering in a web application target-web page-specific alternative content.

15. The computing system of claim 14, wherein the alternative content includes an identification of a setting, configuration, or parameter causing the wait time threshold to be exceeded.

16. The computing system of claim 14, wherein the web application is implemented in a multi-tenant environment in which data for multiple tenants is stored on a same physical computer, and wherein identifying the target web page to be monitored for delay in loading content is based on activity of one or more other tenants of the multiple tenants.

17. The computing system of claim 14, wherein the wait time threshold is dynamically adjusted using machine learning in response to (i) a history of delays in loading the content of the target web page or content of web pages sharing characteristics with the target web page or (ii) user feedback regarding the target web page.

18. One or more non-transitory computer-readable storage media comprising:
   computer-executable instructions that, when executed by a computing system comprising at least one hardware processor and at least one memory coupled to the at least one hardware processor, cause the computing system to, from the plurality of web pages, identify a target web page, associated with a web application, to be monitored for delay in loading content, the identifying comprising using load times determined by monitoring the plurality of web pages, identifying the target web page as previously slow, identifying the target web page as displaying a large amount of data, or identifying the target web page by determining that data used by the target web page resides on a data store affected by a noisy neighbor tenant;
   computer-executable instructions that, when executed by the computing system, cause the computing system to, in response to the identifying, add the target web page to a slow web page list;
   computer-executable instructions that, when executed by the computing system, cause the computing system to establish a wait time threshold for the target web page subsequent to the identifying, wherein wait time thresholds for at least a portion of a plurality of web pages of the slow web page list differ from one another;
   computer-executable instructions that, when executed by the computing system, cause the computing system to, based on the target web page being on the slow web page list, monitor load times for the target web page;
   computer-executable instructions that, when executed by the computing system, cause the computing system to receive a request for the target web page through the web application; and
   computer-executable instructions that, when executed by the computing system, cause the computing system to, upon determining that a delay in loading content of the target web page exceeds the wait time threshold, load and render in a web application target-web page-specific alternative content.

19. The one or more non-transitory computer-readable storage media of claim 18, wherein the alternative content includes an identification of a setting, configuration, or parameter causing the wait time threshold to be exceeded.

20. The one or more non-transitory computer-readable storage media of claim 18, wherein the web application is implemented in a multi-tenant environment in which data for multiple tenants is stored on a same physical computer, and wherein identifying the target web page to be monitored for delay in loading content is based on activity of one or more other tenants of the multiple tenants.

* * * * *